(12) United States Patent
Schörghuber

(10) Patent No.: US 9,035,220 B2
(45) Date of Patent: May 19, 2015

(54) COLD-METAL-TRANSFER WELDING PROCESS AND WELDING INSTALLATION

(75) Inventor: Manfred Schörghuber, Wels (AT)

(73) Assignee: Fronius International GmbH, Pettenbach (AT)

( * ) Notice: Subject to any disclaimer, the term of this patent is extended or adjusted under 35 U.S.C. 154(b) by 910 days.

(21) Appl. No.: 11/920,516

(22) PCT Filed: May 18, 2006

(86) PCT No.: PCT/AT2006/000205
§ 371 (c)(1),
(2), (4) Date: Nov. 16, 2007

(87) PCT Pub. No.: WO2006/125234
PCT Pub. Date: Nov. 30, 2006

(65) Prior Publication Data
US 2009/0026188 A1    Jan. 29, 2009

(30) Foreign Application Priority Data
May 24, 2005    (AT) .................................. A 883/2005

(51) Int. Cl.
*B23K 9/00* (2006.01)
*B23K 9/12* (2006.01)

(52) U.S. Cl.
CPC ...................................... *B23K 9/124* (2013.01)

(58) Field of Classification Search
CPC ....................................................... B23K 9/124
USPC .................... 219/132, 130.5, 130.31, 130.32, 219/130.33, 130.21, 137 PS
See application file for complete search history.

(56) References Cited

U.S. PATENT DOCUMENTS 5,837,968 A * 11/1998 Rohrberg et al. ........... 219/130.1
6,297,473 B2 * 10/2001 Hiraoka et al. ........... 219/125.12
6,969,823 B2 * 11/2005 Huismann et al. ......... 219/130.5

(Continued)

FOREIGN PATENT DOCUMENTS

DE    197 38 785 A1    4/1999
EP    1 384 546 A2    1/2004

(Continued)

OTHER PUBLICATIONS

Official translation of Artelsmair WO 0064620.*
Official translation of Artelsmair WO 0064620, filed Apr. 26, 1999.*
International Search Report, Nov. 16, 2007.

*Primary Examiner* — Thien S Tran
(74) *Attorney, Agent, or Firm* — Collard & Roe, P.C.

(57) ABSTRACT

A cold metal transfer welding process is defined by the cyclic alternation of an arc phase and a short-circuit phase. During the arc phase, a welding rod is displaced towards the workpiece until it makes contact with the workpiece and during the short-circuit phase the welding rod displacement is reversed and the welding rod is then moved away from the workpiece. The welding current and/or the welding voltage are controlled during the arc phase in such a way that the welding rod melts, forming a droplet and that during the short-circuit phase a breaking of the short-circuit is suppressed using the welding current. A welding installation for carrying out the welding method achieves optimal welding results using the smallest possible number of settings by setting a displacement frequency of the welding rod as a welding parameter using a control organ.

14 Claims, 13 Drawing Sheets

(56) References Cited

U.S. PATENT DOCUMENTS

| | | |
|---|---|---|
| 6,984,806 B2 | 1/2006 | Huissmann et al. |
| 7,220,941 B2 * | 5/2007 | Niedereder et al. .......... 219/132 |
| 2002/0153363 A1 | 10/2002 | Hiraoka et al. |
| 2005/0103768 A1 * | 5/2005 | Ward ........................ 219/132 |
| 2006/0196862 A1 * | 9/2006 | Sickels ..................... 219/130.5 |
| 2007/0056944 A1 | 3/2007 | Artelsmair |
| 2008/0290079 A9 | 11/2008 | Artelsmair |

FOREIGN PATENT DOCUMENTS

| | | | | |
|---|---|---|---|---|
| EP | 1 384 547 A | | 1/2004 | |
| JP | 56 009062 A | | 1/1981 | |
| JP | 56-009062 A | * | 1/1981 | ............... B23K 9/06 |
| WO | WO 00/64620 | * | 11/2000 | ............ B23K 90/73 |
| WO | WO 00/64620 A | | 11/2000 | |
| WO | WO 2005/042199 | | 5/2005 | |
| WO | WO 2005/042200 | | 5/2005 | |

* cited by examiner

COLD-METAL-TRANSFER WELDING PROCESS AND WELDING INSTALLATION

CROSS REFERENCE TO RELATED APPLICATIONS

Applicant claims priority under 35 U.S.C. §119 of Austrian Application No. A 883/2005 filed May 24, 2005. Applicant also claims priority under 35 U.S.C. §365 of PCT/AT2006/000205 filed May 18, 2006. The international application under PCT article 21(2) was not published in English.

The invention relates to a cold-metal-transfer welding process, in the following referred to as CMT process, in which the welding process is defined by the cyclic alternation of an electric arc phase and a short-circuit phase, wherein, during an electric arc phase, a welding wire is moved in the direction of a workpiece until contacting the workpiece, subsequently, after the formation of a short-circuit and during the short-circuit phase, the wire transport is reversed and the welding wire is moved away from the workpiece, wherein the welding current and/or the welding voltage are controlled during the electric arc phase in such a manner that the welding wire is melted to form a droplet and that an opening of the short-circuit during the short-circuit phase is prevented via the welding current, wherein welding parameters are set to determine the welding process.

In a cold-metal-transfer welding process, the welding wire, after the short-circuit phase, is usually moved away from the workpiece until the short-circuit is opened, and/or as far as to a defined distance from the workpiece, and/or over a defined time duration.

The invention, moreover, relates to a welding installation including a welding apparatus, at least one control device including a memory for operation data and/or programs, a current source, a wire feeder for transporting a welding wire, a welding torch connectible to the welding apparatus, and an input and/or output device including at least two control elements for setting welding parameters.

From EP 1 384 546 A2, a method for controlling a welding current source is known, in which the waveform of the welding current comprises at least an electric arc portion and a short-circuit portion. During the welding process, a short-circuit phase is initiated by moving the welding wire until contacting the workpiece and an electric arc phase is initiated by moving the welding wire back. The short-circuit portion of the welding current is applied during the short-circuit phase before the welding wire is lifted from the workpiece to form an electric arc. The short-circuit portion has the current maximum in a period of the welding current such that high current will flow through the welding wire and the workpiece in the short-circuit phase. The lower-quantity electric arc portion of the welding current is applied as the welding wire is being moved back while forming the electric arc. The waveform of the welding current and the return movement of the welding wire, which comprise several different phases, are respectively coordinated. In doing so, it is disadvantageous that the duration of the periodically alternating electric arc phase and short-circuit phase cannot be directly set at the welding apparatus, but only indirectly via welding parameters like the welding current, wire feed speed etc.

From DE 197 38 785 A1, an electronic welding energy source for performing a welding process in which an electric arc phase and a short-circuit phase are cyclically alternated is known. However, the new setting of welding parameters for determining the welding process is relatively complex and, in most cases, requires appropriate knowledge from the operator.

US 2002/0153363 A1 describes a welding method in which the melting rate of the welding wire is controllable. Yet, as in other prior art welding processes, the definition of the welding process requires also there the adjustment of a great number of welding parameters at the welding apparatus and, hence, appropriate knowledge from the operator.

The object of the present invention consists in providing an above-identified welding process and welding installation, which enable the use of the complex interaction between the individual welding parameters to obtain optimum welding results and optimum weld qualities at as low a number of settings at the welding apparatus as possible. Consistent results are to be achieved irrespectively of the respective process states.

The object of the invention in method terms is achieved in that, via a control element, as one of the welding parameters a movement frequency of the welding wire, by which the number of electric arc phases and short-circuit phases per second is defined, and at least one additional welding parameter are set, and all the other welding parameters required to obtain the preset movement frequency are determined and set and controlled by a control device. The movement frequency, thus, indicates per second the number of periods each formed by an electric arc phase and a short-circuit phase. The user sets said movement frequency and at least one further welding parameter, whereupon the control device, based on these data, will automatically determine and set and control all other necessary welding parameters such as the welding current and the wire feed speed, so that the set movement frequency will be maintained during the welding process. No special welding knowledge is required from the user. Thus, also a very quick and user-friendly adjustment facility is provided. Similarly, the uniform introduction of filler material into the melt bath is safeguarded such that a defined weld and, hence, an improved appearance of the workpiece connection will be achieved. A constant movement frequency and, hence, a constant welding quality and, in particular, constant weld width will be obtained despite disturbances during the welding process, e.g. at a change of the length of the electric arc. Relevant parameters further include the welding current and the wire feed speed.

In addition to the movement frequency, the material thickness, the diameter of the welding wire or the melting rate may, in particular, be set.

Advantageously, welding parameters such as, for instance, the welding current and/or the wire feed speed, during the electric arc phase over a defined time duration for the formation of a droplet on the welding wire, are controlled in such a manner that a constant distance of the welding wire to the workpiece is achieved at a constant wire feed speed, which distance corresponds to the length of the electric arc between the welding wire and the workpiece. It is, thus, for instance, only required in a simple manner to accordingly adjust and control the welding current, since the time of the next short-circuit is known on account of the set movement frequency and the former can, thus, be readily initiated by the control device of the welding apparatus.

If, during the electric arc phase, in order to initiate the short-circuit phase, the welding current is lowered to keep the droplet of the welding wire in the molten state without further melting of the welding wire, the short-circuit phase can be selectively initiated while avoiding weld spatter. The deliberate lowering of the welding current prior to the initiation of the short-circuit phase causes a reduction of the pressure of the electric arc so as to prevent the droplet from being thrown off on molten material at a contact of the welding wire with the workpiece and, hence, ensure a continuous transition.

If, during the electric arc phase, in order to initiate the short-circuit phase, particularly during or after the lowering of the welding current, the wire feed speed is increased to reduce the length of the electric arc between the welding wire and the workpiece until the short-circuit occurs, the short-circuit will be reached more rapidly, thus reducing the time until the formation of the short-circuit. This allows for an increase in the time duration for the electric arc phase and, hence, the melting of a larger amount of filler material.

If the length of the electric arc between the welding wire and the workpiece is monitored during the electric arc phase, and if changes in the length of the electric arc are controlled via the welding parameters, in particular the wire feed speed and the welding current, in such a manner as to cause the short-circuit phase to occur at the set movement frequency, surface faults on the workpiece such as depressions or elevations will be recognized and corrected, and a premature initiation of the short-circuit phase will be avoided.

During the short-circuit phase, the welding parameters can be controlled with a view to changing the duration of the short-circuit phase so as to cause the subsequent electric arc phase to start at the set movement frequency. The control of the temperature of the melt bath and, hence, the penetration will, thus, be feasible in an advantageous manner.

If, in addition to the movement frequency, the heat input into the workpiece is set, and the ratio of the duration of the short-circuit phase to the duration of the electric arc phase and/or a profile of the welding current are fixed as a function of the set heat input, material distortion as a function of the heat input will, for instance, be reduced. Furthermore, the temperature of the melt bath and the penetration can be adjusted accordingly.

In an advantageous manner, the movement frequency is set between 1 Hz and 150 Hz, preferably between 30 Hz and 70 Hz. This ensures particularly user-friendly handling. For instance, when using charts, the user will be able to quickly find out the optimum movement frequency for the respective workpiece to be processed.

The frequency of the melt bath vibration can be selectively influenced through the movement frequency of the welding wire. By choosing a low movement frequency, the natural vibration of the melt bath can be strongly reduced in a simple manner so as to avoid weld spatter. Similarly, an increase of the movement frequency will lead to an increase in the natural vibration of the melt bath and, hence, improve the gap bridging ability in an advantageous manner. It is, thus, feasible, by the adjustment of the movement frequency, to enforce a selective excitation of the vibration of the melt bath.

According to a further characteristic feature of the invention, it is contemplated that the welding parameters are determined and set and controlled as a function of a defined profile of the length of the electric arc and/or the welding voltage. This will, for instance, provide a higher melting rate.

The object according to the invention is also achieved by an above-identified welding installation, in which a control element for setting a movement frequency to define the number of electric arc phases and short-circuit phases per second is arranged on the input and/or output device, and the control device for performing a cold-metal-transfer welding process is configured according to any one of the above-mentioned characteristic features. The control element for setting the movement frequency for the CMT process allows for the automatic determination and adjustment and control of many of the remaining welding parameters required.

The control element for setting the movement frequency can be designed as a rotary knob. A scale ranging, for instance, from 1 to 150 Hz can be provided beside or on the rotary knob so as to enable simple settings and changes. An appropriate shape and size of the rotary knob will enable simple handling even if the welder wears welding gloves.

A control element may also be configured as a rotary knob for setting the material and the material thickness, optionally with a scale provided beside the rotary knob and assigned to the material and the material thickness. In an advantageous manner, two welding parameters are set by a single position of the rotary knob.

A control element for setting a value for the heat input into the workpiece may also be arranged on the input and/or output device, thus enabling simple setting of the heat input into the workpiece and the melt bath temperature related thereto.

The control element for setting the value for the heat input into the workpiece may be designed as a rotary knob, optionally with a scale provided beside or on the rotary knob and assigned to the heat input, said scale ranging, for instance, from 1 to 100.

At least one control element may also be comprised of a display with an input field, in particular, a touch screen. The control element for setting the movement frequency, at least one further welding parameter and the value for the heat input in terms of software is completely or partially configured via an input field and/or with a graphic support. This enables the setting of an exact value for the respective welding parameter.

Advantageously, a remote controller for setting the welding parameters, in particular the movement frequency, and the value for the heat input is also arranged on the welding torch. The respective welding parameters can, thus, be changed during the welding process.

The present invention will be explained in more detail by way of the attached drawings. Therein:

Figure 10:
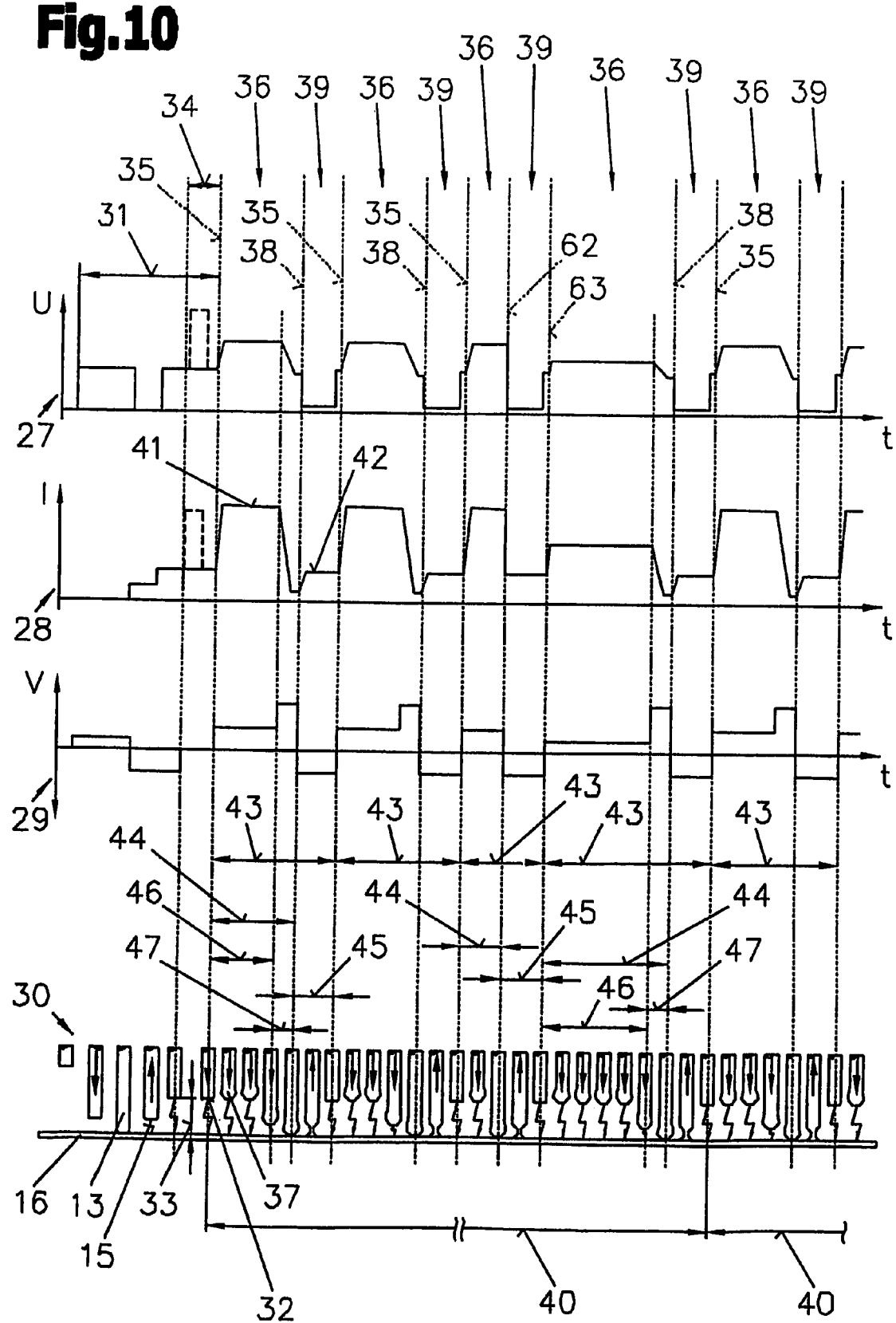
Figure 11:
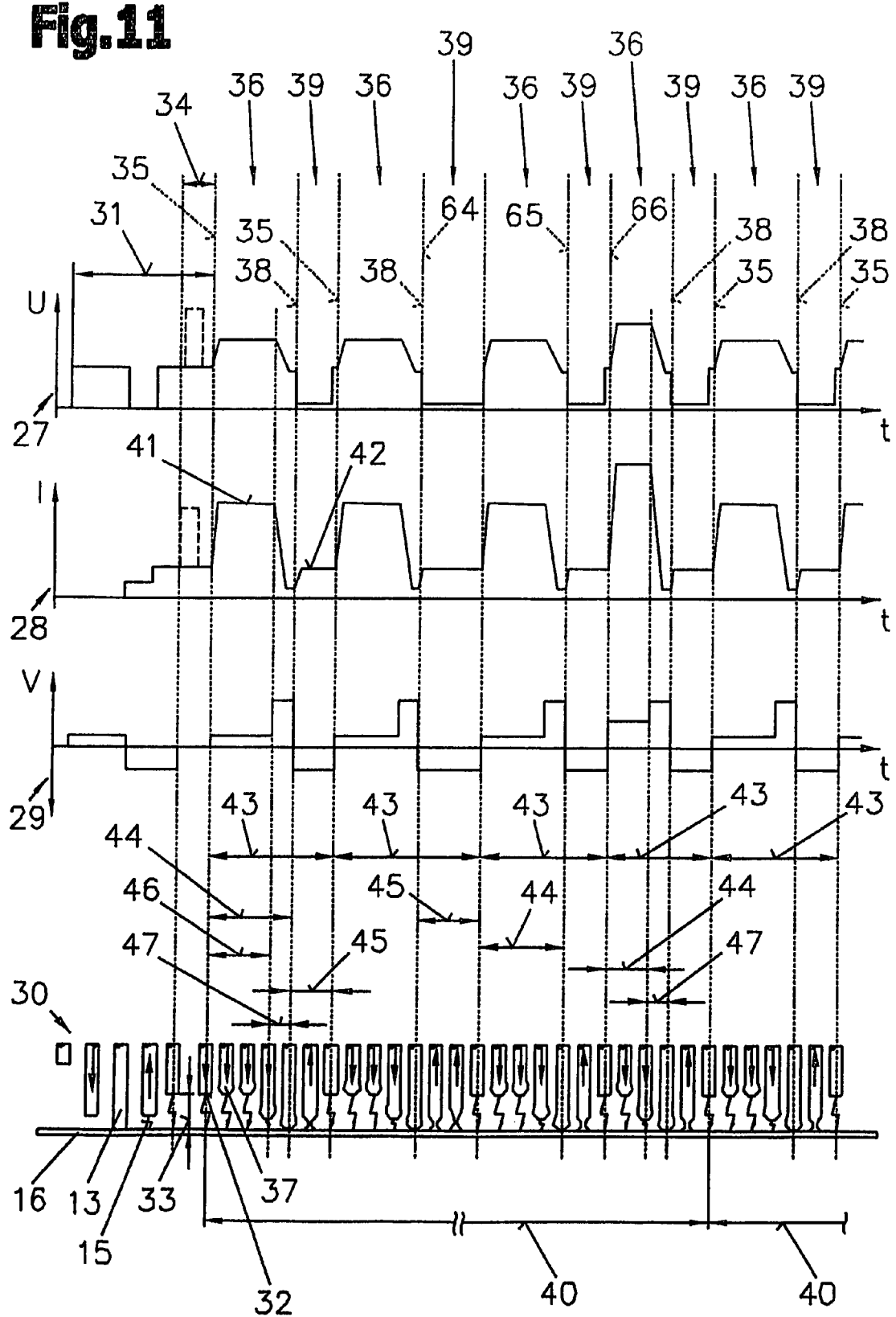
Figure 12:
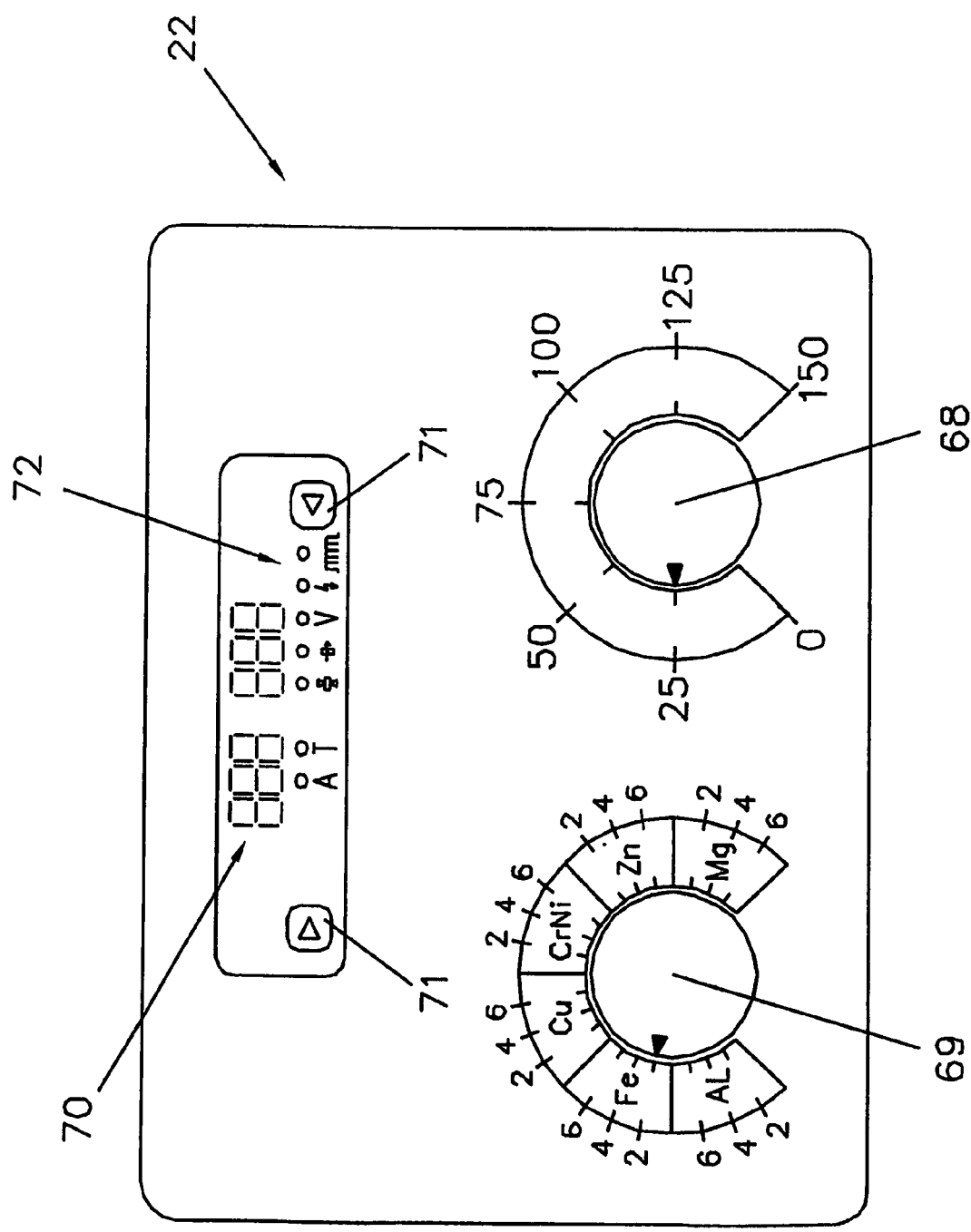
Figure 13:
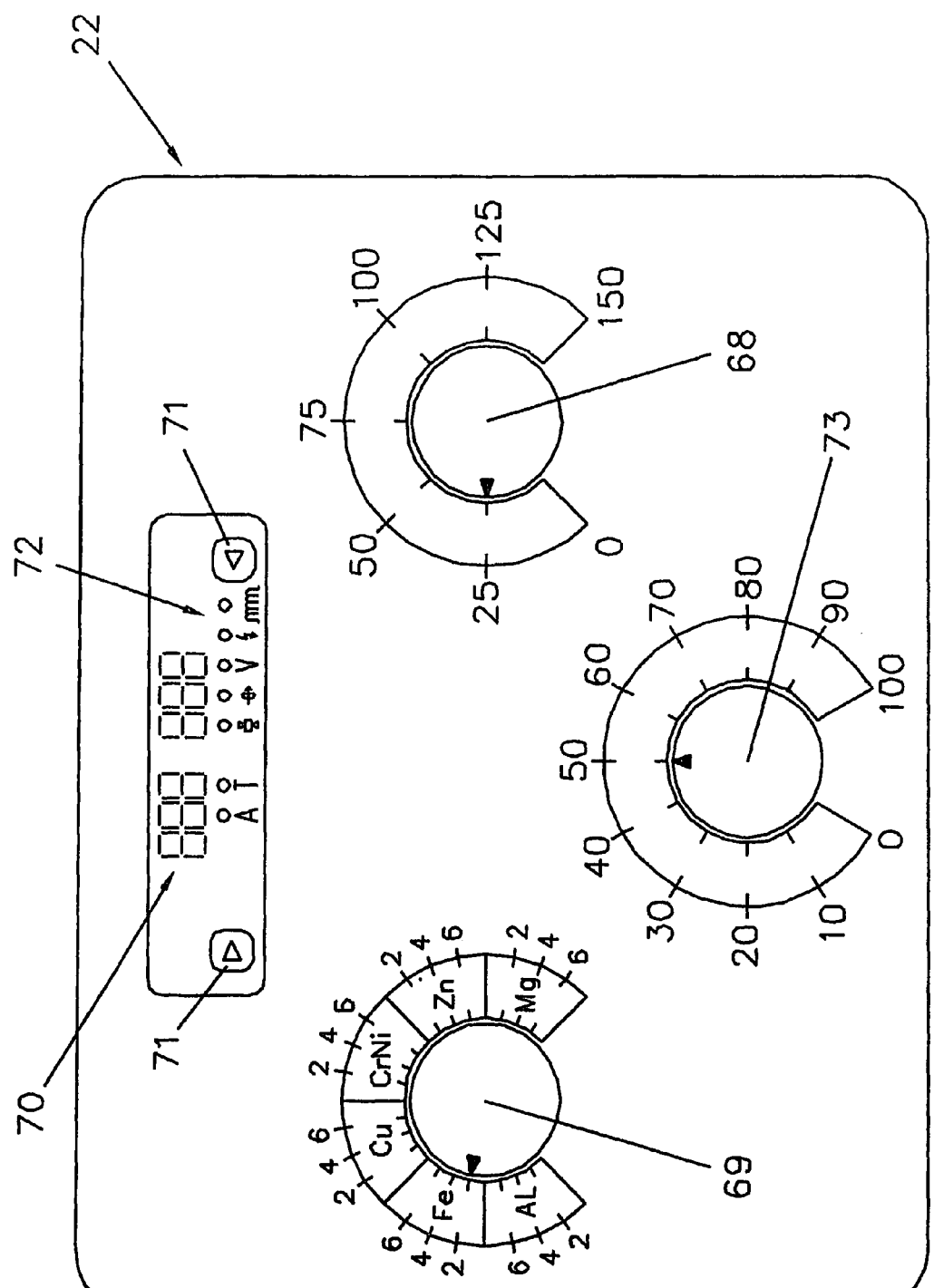

FIGS. 10 and 11 indicate time courses of the welding voltage, welding current and wire feed speed as well as a movement diagram for the welding wire, by way of an undefined short-circuit and by way of an extended short-circuit phase, during welding processes according to the invention; and FIGS. 12 and 13 depict embodiments of an input and/or output device of a welding installation according to the invention.

Figure 1:
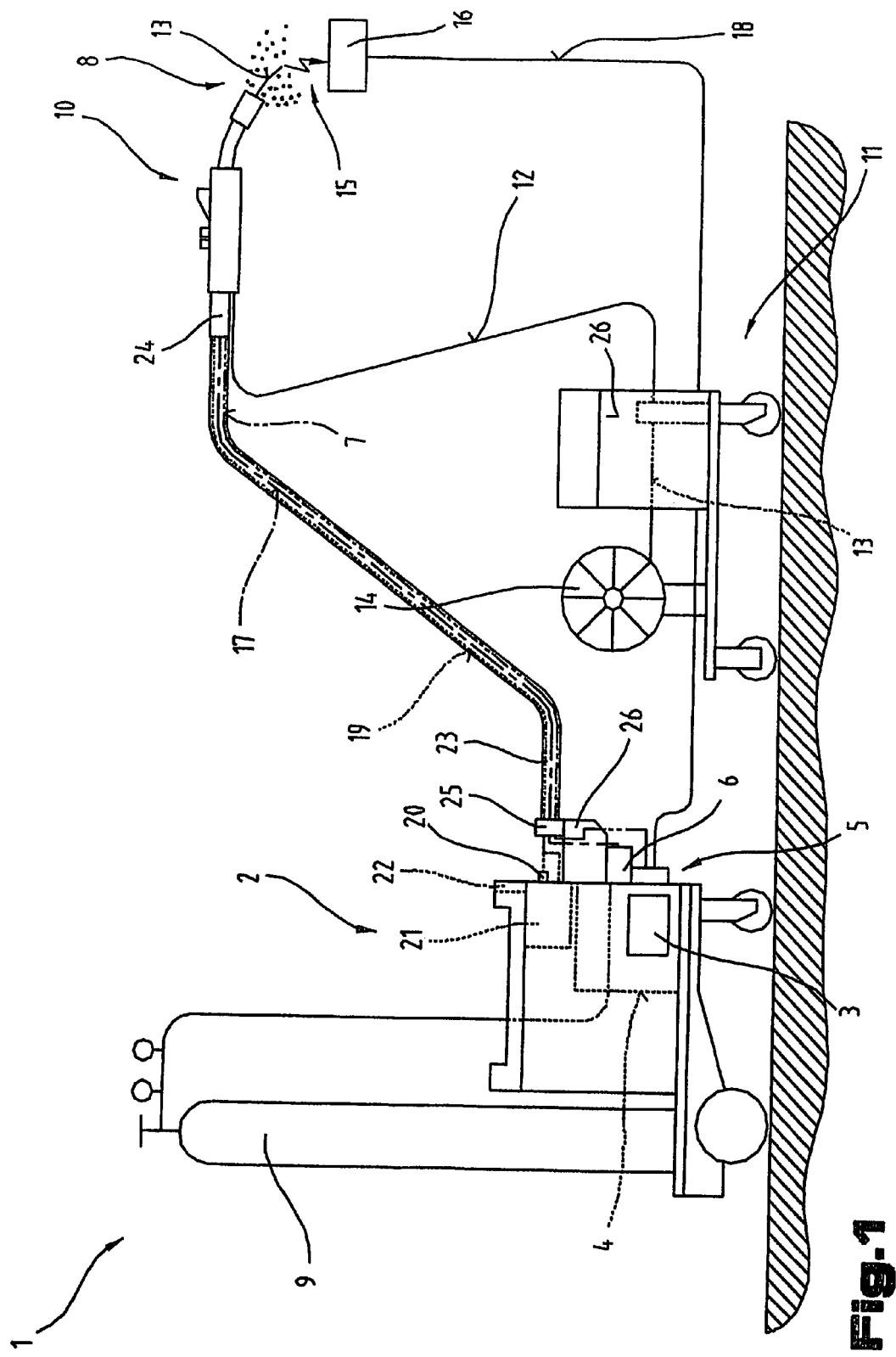
FIG. 1 is an exemplary illustration of a welding apparatus.

FIG. 1 depicts a welding apparatus 1 for various processes or methods such as, e.g., MIG/MAG welding or WIG/TIG welding, or electrode welding methods, double-wire/tandem welding methods, plasma or soldering methods etc.

The welding apparatus 1 comprises a power source 2 including a power element 3, a control device 4, and a switch member 5 associated with the power element 3 and control device 4, respectively. The switch member 5 and the control device 4 are connected to a control valve 6 arranged in a feed line 7 for a gas 8, in particular a protective gas such as, for instance, carbon dioxide, helium or argon and the like, between a gas reservoir 9 and a welding torch 10 or torch.

In addition, a wire feeder 11, which is usually employed in MIG/MAG welding, can be controlled by the control device 4, whereby a filler material or welding wire 13 is fed from a feed drum 14 or wire coil into the region of the welding torch 10 via a feed line 12. It is, of course, possible to integrate the wire feeder 11 in the welding apparatus 1 and, in particular, its basic housing, as is known from the prior art, rather than designing the same as an accessory device as illustrated in FIG. 1.

It is also feasible for the wire feeder 11 to supply the welding wire 13, or filler metal, to the process site outside the welding torch 10, to which end a non-consumable electrode is preferably arranged within the welding torch 10, as is usually the case with WIG/TIG welding.

The power required to build up an electric arc 15, in particular an operative electric arc, between the non-consumable electrode (not illustrated) and a workpiece 16 is supplied from the power element 3 of the power source 2 to the welding torch 10, in particular electrode, via a welding line 17, wherein the workpiece 16 to be welded, which is preferably formed by several parts, via a further welding line 18 is likewise connected with the welding apparatus 1 and, in particular, power source 2 so as to enable a power circuit for a process to build up over the electric arc 15, or a plasma jet formed.

To provide cooling of the welding torch 10, the welding torch 10 can be connected to a fluid reservoir, in particular a water reservoir 21, by a cooling circuit 19 via an interposed flow control 20 so as to cause the cooling circuit 19, in particular a fluid pump used for the fluid contained in the water reservoir 21, to be started as the welding torch 10 is put into operation, in order to effect cooling of the welding torch 10 by feeding a cooling medium.

The welding apparatus 1 further comprises an input and/or output device 22, via which the most different welding parameters, operating modes or welding programs of the welding apparatus 1 can be set and called, respectively. In doing so, the welding parameters, operating modes or welding programs set via the input and/or output device 22 are transmitted to the control device 4, which subsequently controls the individual components of the welding system or welding apparatus 1 and/or predetermines the respective reference values for controlling.

In the exemplary embodiment illustrated, the welding torch 10 is, furthermore, connected with the welding apparatus 1 or welding system via a hose pack 23. The hose pack 23 houses the individual lines from the welding apparatus 1 to the welding torch 10. The hose pack 23 is connected with the welding torch 10 via a coupling mechanism 24, whereas the individual lines arranged in the hose pack 23 are connected with the individual contacts of the welding apparatus 1 via connection sockets or plug-in connections. In order to ensure an appropriate strain relief of the hose pack 23, the hose pack 23 is connected with a housing 26, in particular the basic housing of the welding apparatus 1, via a strain relief means 25. It is, of course, also possible to use the coupling mechanism 24 for connection to the welding apparatus 1.

It should basically be noted that not all of the previously mentioned components have to be used or employed for the various welding methods or welding apparatus 1 such as, e.g., WIG devices or MIG/MAG apparatus or plasma devices. Thus, it is, for instance, possible to devise the welding torch 10 as an air-cooled welding torch 10.

Figure 2:
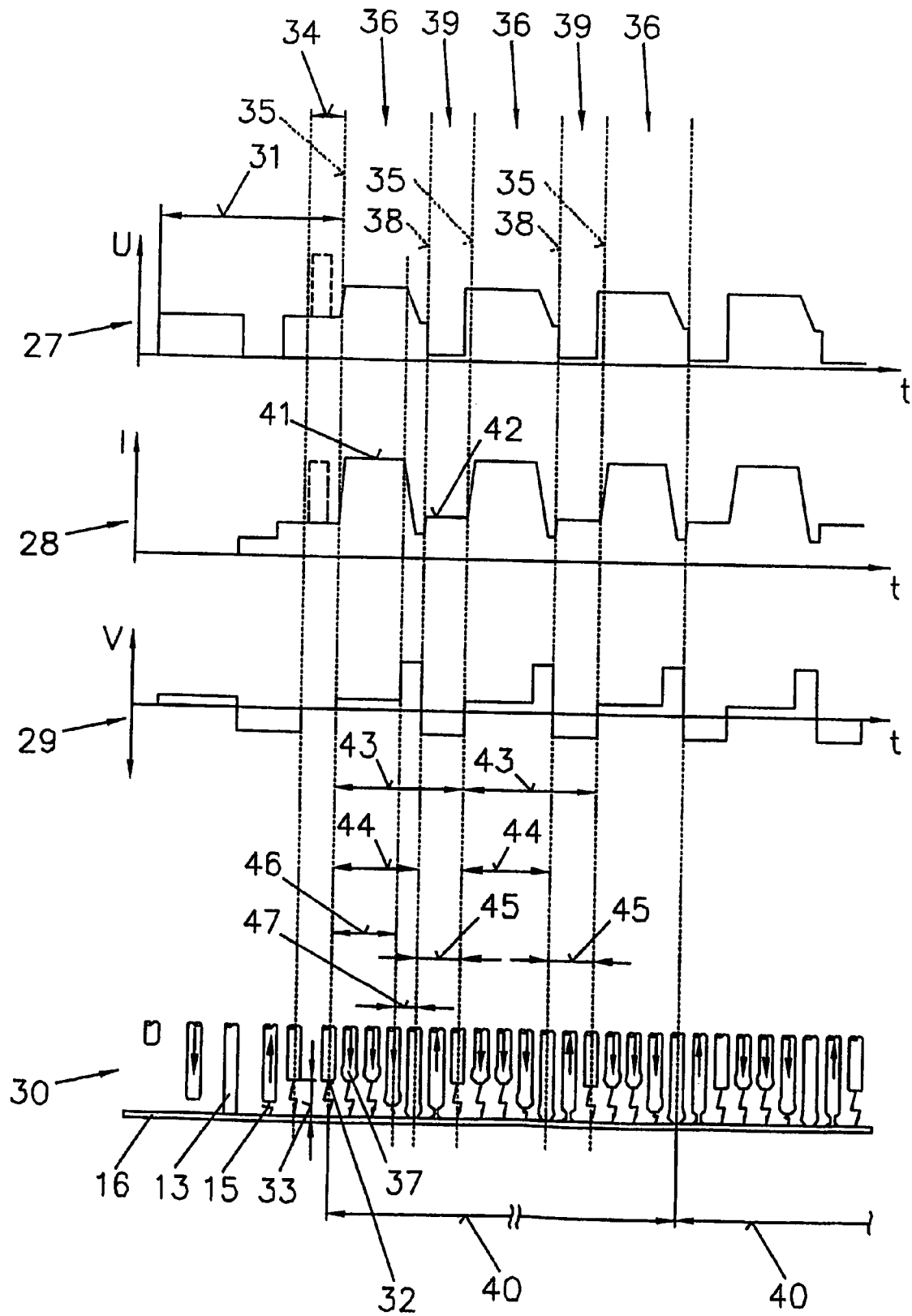
FIGS. 2 to 7 illustrate the time courses of the welding voltage, welding current and wire feed speed as well as a movement diagram for the welding wire subject to a defined movement frequency, by way of various examples of welding processes according to the invention.

FIG. 2 schematically illustrates an exemplary embodiment of a welding process according to the invention, by way of diagrams 27 to 30 respectively indicating the time courses of the welding voltage U, welding current I, wire feed speed V and movements or positions of the exit-side end of the welding wire 13 relative to the workpiece 16.

In the illustrated welding method for controlling and/or adjusting the welding apparatus 1 or welding current source, a consumable electrode or welding wire 13 is used. In doing so, melting of the workpiece 16 and the welding wire 13 is effected via the ionized plasma column or electric arc 15 built up between the welding wire 13 and the electric antipole on the workpiece 16.

The ignition of the electric arc 15 can be effected by any desired method, for instance in the manner of the lift-arc principle known from the prior art, in which an idle voltage is applied to the welding wire 13 during an ignition phase 31. After this, the welding wire 13 is conveyed in the direction of the workpiece 16 until contacting the workpiece 16, whereupon the resulting short-circuit in a short-circuit phase is broken up by reversing the conveying direction of the welding wire 13. This causes the formation of an electric arc 15, with the return transport of the welding wire 13 from the workpiece 16 being effected as far as to an upper dead center 32 for reaching a defined distance 33 and/or after a defined time duration. The current in the ignition phase 31 in one or several step(s) is limited in such a manner as to prevent the welding wire 13 from melting.

The first ignition of the electric arc 15 at what is called a high-frequency ignition can also be effected via a high-frequency voltage signal (not illustrated).

After the ignition of the electric arc 15, or reaching of the distance 33, it is also possible to carry out a first, short stabilization phase 34 with an elevated heat input (as illustrated by broken lines) over a defined time duration prior to the welding process proper, and subsequently perform the welding process comprised of cyclically repeated welding process phases. This has the advantage that the short stabilization phase 34 at high heat input causes the stabilization of the electric arc 15 and/or heating of the workpiece 16 or melt bath, respectively. Moreover, the welding wire 13 is heated by the stabilization phase 34 so as to allow the subsequent welding process to be started with a preheated welding wire 13, which will substantially enhance the welding quality.

After the ignition phase 31 and the optional stabilization phase 34, the welding process proper takes place at time 35, with a cold-metal-transfer welding process, in the following referred to as CMT process, being carried out according to the invention. In the CMT process, the welding wire 13, in the process phase herein denoted as electric arc phase 36, is advanced until contacting the workpiece 16. In the electric arc phase 36, incipient melting of the welding wire 13 occurs so as to cause the formation of a droplet 37 on the end of the welding wire. In doing so, the welding current and/or welding voltage in the electric arc phase 36 is controlled such that no droplet detachment takes place and a short-circuit occurs at time 38 to initiate the short-circuit phase 39. In the short-circuit phase 39, wire feeding is reversed, thus causing the welding wire 13 to be moved back from the workpiece 16 until the opening of the short-circuit, i.e. the formation of the electric arc 15, and/or the defined distance 33 and/or a defined time duration. Thus, another electric arc phase 36 occurs at time 35, whereupon the direction of movement of the welding wire 13 is again reversed at an upper dead center 32, with the welding wire 13 being moved in the direction of the workpiece 16.

The welding wire 13, thus, performs an alternating movement towards the workpiece 16, and away from the workpiece 16, during the welding process. The wire feeder 11 is substantially controlled in a manner that a negative signal, or rearward movement of the welding wire 13, occurs during the short-circuit phase 39 and an electric arc 15 is built up subsequently, and a positive signal, or forward movement of the welding wire 13 in the direction of the workpiece 16, occurs during the electric arc phase 36, in which the heating or melting of the welding wire 13 is effected to cause droplet formation. The control of the direction of movement of the welding wire 13, however, need not necessarily correlate with the occurrence of the electric arc phase 36 or short-circuit phase 39, respectively, since the electric arc phase 36 may, for instance, already occur during the backward movement of the welding wire 13 by a selective heat input via the control of the current level in the welding circuit. It is, thus, also feasible with an already present electric arc 15 to continue moving the welding wire 13 away from the workpiece 16 until a defined time or distance.

Droplet detachment is effected in a manner that, after having reached the dead center 32, the welding wire 13 is advanced until contacting the workpiece 16. On account of the surface tension of the droplet 37 on the welding wire 13 and in the melt bath as well as other known acting physical effects, the droplet is detached from the welding wire 13. By the rearward movement of the welding wire 13, reignition of the electric arc 13 is encouraged. To promote droplet detachment, an increase, in particular a pulse-like increase, in the welding current I can be effected during the short-circuit phase 39 (not illustrated). In the illustrated embodiment, the electric arc phase 36 periodically alternates with the short-circuit phase 39 for the duration of the CMT process.

No further procedural details of the CMT process will herein be discussed, because the latter is already known from the prior art for welding processes with constant and varying polarities of the welding current on the welding wire 13 and the workpiece 16, respectively.

To expand the options of intervention in the welding process, the invention provides the setting of a movement frequency 40 of, preferably, between 1 Hz and 150 Hz and, in particular, between 30 Hz and 70 Hz, at which the short-circuit phases 39 and the electric arc phases 36 occur, and of at least one further welding parameter, e.g. the material thickness, on the welding apparatus 1 so as to define the number of short-circuits or short-circuit phases 39 per second. The duration of the periodic electric arc phases 36 and short-circuit phases 39 can, thus, be defined on grounds of the set movement frequency 40. In the exemplary embodiments described below, the period duration corresponding to the movement frequency 40 is schematically plotted.

The voltage U, or current I, is raised to a first level after time 35 has been exceeded. Optionally, this level may be fixed as the operating level to be kept constant during the entire electric arc phase 36 and the short-circuit phase 39 or follows a welding process profile. According to diagram 28, the welding current I comprises a first portion, the operating current 41, and at least one further portion, the base current 42, which guarantees the safe reignition of the electric arc 15. Preferably, the base current 42 is comparatively small relative to the operating current 41, wherein the current intensity of the operating current 41 may, for instance, amount to 1.5 times to 10 times, in particular 4 to 8 times, the current intensity of the base current 42. The base current 42 may, for instance, be 5 A to 50 A, in particular about 10 to 30 A, whereas the operating current 41 may, for instance, be 50 A to 500 A.

In accordance with the invention, the number of short-circuits per second is defined by the set movement frequency 40. A movement frequency 40 of, for instance, 50 Hz therefore corresponds to 50 short-circuits per second. Thus, a period duration 43 can be determined, which is subsequently subdivided into a time duration 44 for the electric arc phase 36 and a time duration 45 for the short-circuit phase 39 by the control device 4 on grounds of the deposited values, or by a deposited calculation module. The time duration 44 during the time duration 45 can be kept approximately constant. During the welding process, time durations 44 and 45 can be reset accordingly, based on the actual welding process conditions, such that the respective number of short-circuits will always be reached within a second, or a short-circuit will accordingly be reached at the defined time 38 within the period duration 43.

In order to be able to perform a welding process, the user must set at least one further welding parameter in addition to the movement frequency 40 so as to enable the control device 4 to determine the remaining, further welding parameters required in addition, such as, e.g., the welding current I, wire feed speed V etc., on the basis of these at least two parameters, and control the welding process in a manner that the short-circuits or short-circuit phases 39 will be reached in accordance with the set movement frequency 40. It is, for instance, possible for the user to set the material of the workpiece 16 to be processed and/or its material thickness in addition to the movement frequency 40.

In the example according to FIG. 2, the distance 33 of the welding wire 13 to the workpiece 16, or length of the electric arc 15, is kept constant during the electric arc phase 36 such that the wire feed speed V is adapted to the melting rate of the welding wire 13 for the droplet formation during the electric arc phase 36 and, in particular, over at least a major portion of the time duration 44 for the electric arc phase 36. To this end, a constant wire feed speed V is preferably chosen and the welding current I is accordingly controlled such that a constant length of the electric arc 15, or constant distance 33 of the welding wire 13 to the workpiece 16, will result. It goes without saying that also other parameters, in particular the welding current I, can be used as constants, with the further parameters being adjusted accordingly. Hence results a time duration 46, which is part of the time duration 44 of the electric arc phase 36, over which incipient melting of the welding wire 13 takes place and the distance 33 is kept constant. The welding parameters, in particular the operating current 41 and/or the wire feed speed V, will be accordingly controlled by the control device 4. The control of the operating current 41 and the wire feed speed V is effected in that the operating current 41 is adapted to, or controlled as a function of, the size of the droplet 37 and the quantity of the filler material is adapted to, or controlled as a function of, the parameters set in addition to the movement frequency 40, in particular the material thickness, wherein the wire feed speed V is kept constant at a defined value adapted to the melting rate of the welding wire 13 during the time duration 46. No constant readjustment of the welding parameters is, thus, required in the time duration 44, which makes controlling simple and reduces the utilization of the control device and, in particular, the micro-processor. Furthermore, the periodically constant period duration 43, in which also the heat input is constant, provides a constant filler material input, which results in an enhanced optics on account of the defined appearance of the weld. At the end of the time duration 46, an increase in the wire feed speed V is preferably effected for the defined initiation of the short-circuit within a time duration 47 in the electric arc phase 36, as is schematically illustrated in diagram 29. The distance 33 to the workpiece 16 is thereby accordingly reduced until a short-circuit occurs. Simultaneously with the increase in the wire feed speed V, the welding current I, or operating current 41, is preferably lowered to a slight value, or reduced to zero, in order to retain the droplet formed during the time duration 46 on the welding wire 13 rather than cause its transfer into the melt bath in an uncontrolled manner. This causes a reduction of the electric arc pressure to the minimum, with the distance 33 between the electrode or welding wire 13 and the workpiece 16 continuing to decrease. It is thereby ensured in an advantageous manner that the droplet 37, or molten material, will not be thrown off at a contact of the welding wire 13 with the workpiece 16 so as to achieve a continuous transition from the electric arc phase 36 to the short-circuit phase 39 and a strong reduction, if not avoidance, of weld spatter. The increase of the wire feed speed V and the decrease of the operating current 41 cause the short-circuit to occur exactly at time 38, i.e. at the end of the electric arc phase 36, which is defined by the set movement frequency 40. To initiate a short-circuit during time duration 47, it is, however, also possible to maintain the wire feed speed V of the electric arc phase 36 within the time duration 46 and only lower the welding current I or operating current 41. In doing so, a longer time duration 47 will, however, be required for the formation of the short-circuit. This mode of procedure will usually only be applied if a very low movement frequency 40 is set or less material is to be melted, so as to allow for a reduction of the time duration 46.

After the generation of a short-circuit at time 38, the short-circuit is opened at time 35 by a rearward movement of the welding wire 13, i.e. the short-circuit phase 39. Thus, a period with the period duration 43 is completed. By a new ignition of the electric arc 15 during the lift of the welding wire 13 from the workpiece 16, a new period with the period duration 43 is initiated.

Figure 3:
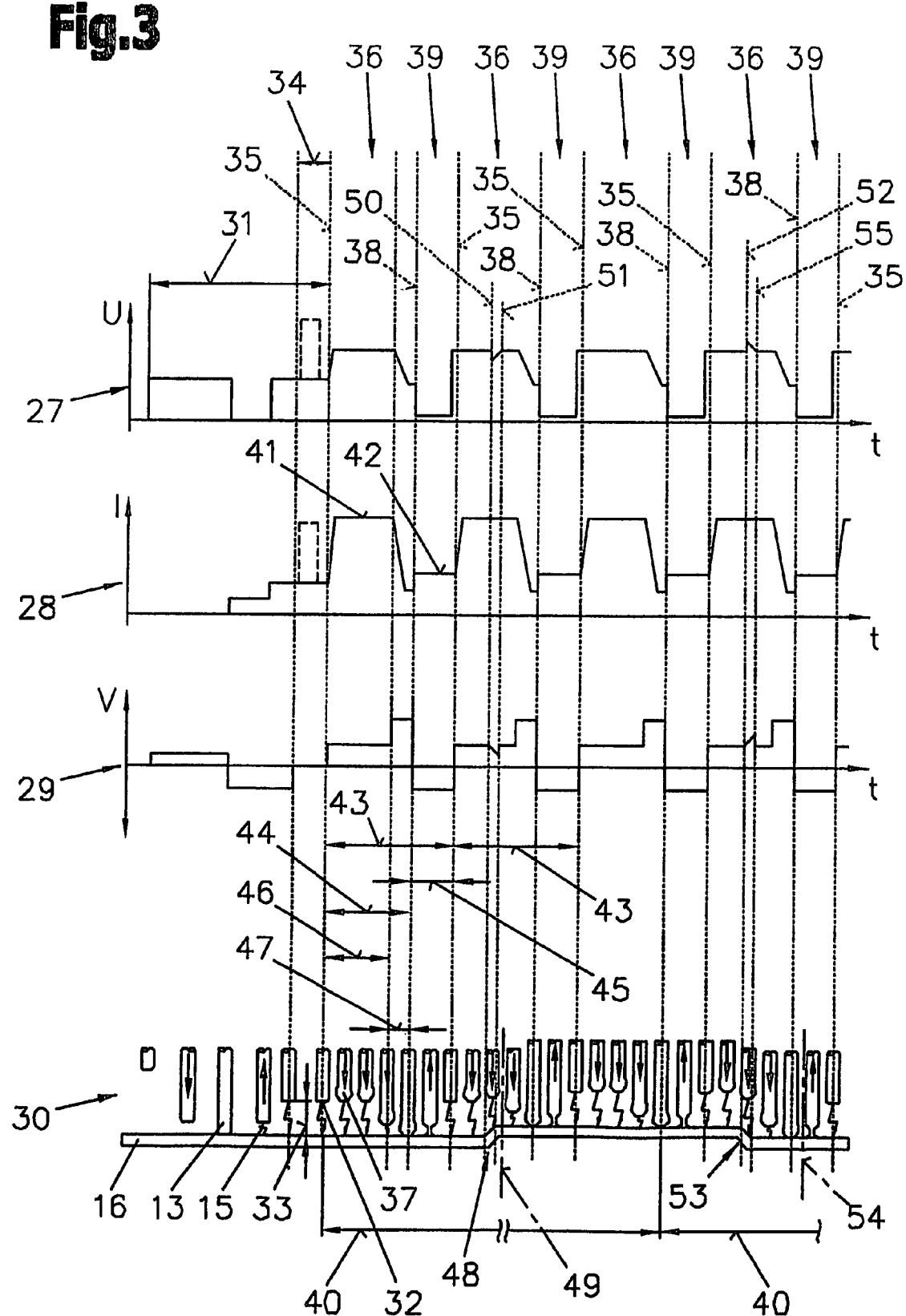
Figure 4:
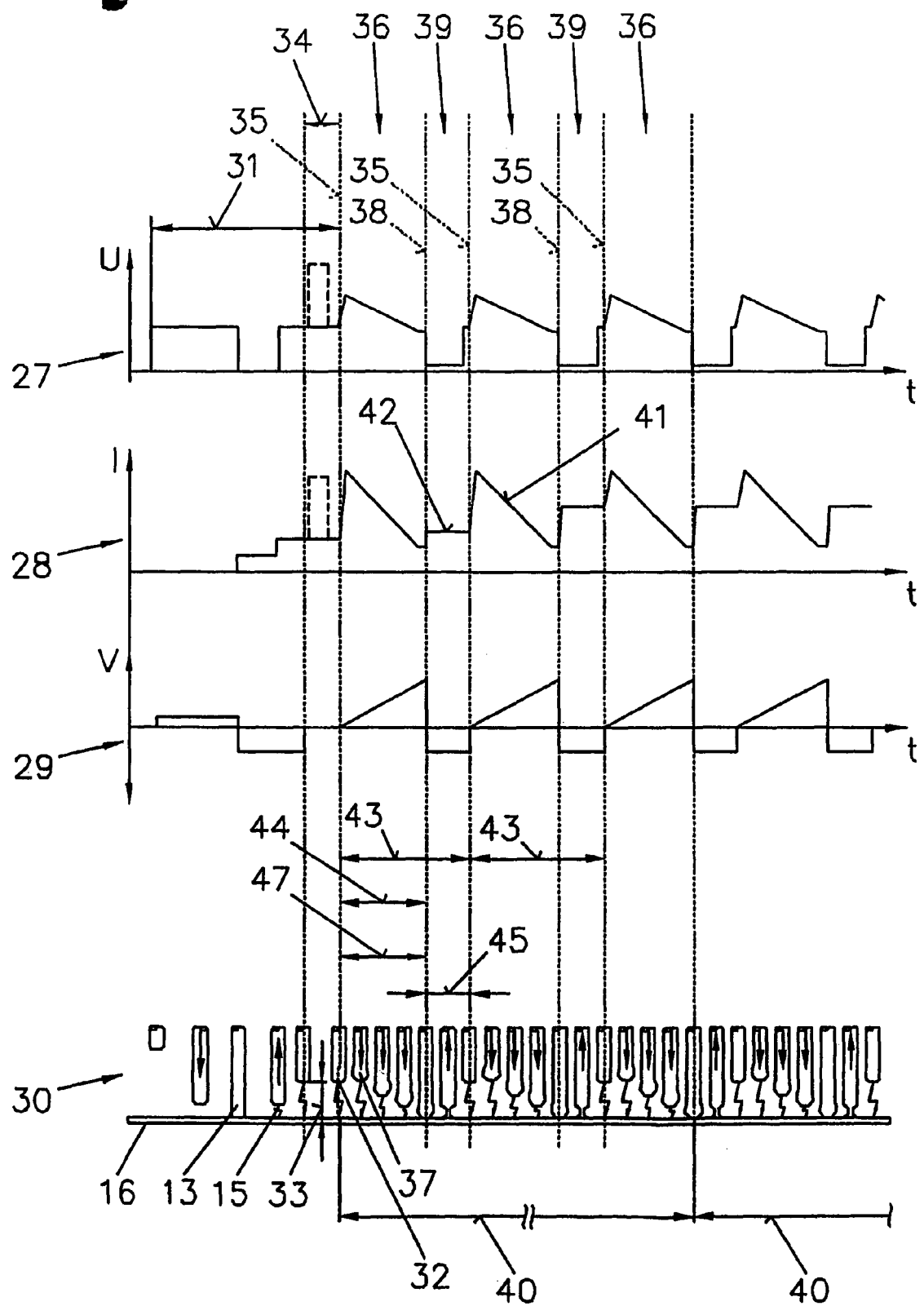

FIG. 3 depicts a further method variant, in which the length of the electric arc 15 is monitored relative to the distance 33. By monitoring the length of the electric arc 15, for instance by evaluating the known welding parameters, welding current I and welding voltage U, by the control device 4, irregularities on the surface of the workpiece 16 will be recognized. By controlling the welding parameters such as the welding current I or wire feed speed V, an undefined short-circuit will be avoided before or after time 38.

An elevation 48 on the surface of the workpiece 16, or a profiled workpiece 16, would cause a premature, undefined short-circuit at time 49 in the absence of a counter-reaction by the control device 4. In this case, the distance 33 or electric arc length would be shortened due to the elevation 48, and hence also the duration 47 during which the welding wire 13 is conveyed to the workpiece 16 would be unexpectedly shortened. By the continuous monitoring of the length of the electric arc 15, it will be recognized that the electric arc 15, starting at time 50, has an unintentionally shorter length than expected by the control device 4. If, however, the elevation 48 is recognized by the control device 4 or any other control device, as is the case at time 50, a counter-reaction will then be initiated to restore the defined distance 33. To this end, the wire feed speed V is, for instance, reduced until the defined length of the electric arc 15 has again been reached (time 51). After this, or at time 51, the wire feed speed V is again raised to the original, constant value preset by the control device 4. The short-circuit phase 39 will, thus, be initiated at the correct time 38 with the period duration 43 defined by the movement frequency 40 being observed.

On the other hand, it is also possible, as is apparent at time 52, that the monitoring of the length of the electric arc 15 reveals a depression 53 on the surface of the workpiece 16, or a profiled workpiece 16, via the extension of the electric arc 15. In the absence of a counter-reaction by the control device 4, the short-circuit would in that case occur at a later time 54 than time 38 as defined according to the set movement frequency 40. To avoid this, the wire feed speed V will be increased upon recognition of the depression 53 until the defined length of the electric arc 15, or the distance 33, has again been reached (time 55). After this, or at time 55, the wire feed speed V is again lowered to the original, constant value preset by the control device 4 and kept constant until the initiation of the short-circuit.

These measures, due to the readjustment of the length of the electric arc during the electric arc phase 36, will safeguard that the short-circuit will occur at the preset time 38 and the set movement frequency 40 will, hence, be observed.

Instead of, or in addition to the welding wire feed, a correction of the length of the electric arc can also be made via the welding torch, by moving the welding torch 10 away from the workpiece 16 upon recognition of an elevation 48 on the workpiece 16 so as to restore the desired length of the electric arc 15.

Such an electric arc length monitoring can also be additionally performed in other exemplary embodiments such as, for instance, in FIG. 2 or FIGS. 4 to 11 below.

FIGS. 4 to 7 depict exemplary embodiments of the CMT process with varying welding parameters while taking into account the preset movement frequency 40. By using electric arc length monitoring, it is also feasible to not keep constant the welding parameters during the electric arc phase 36 for obtaining the movement frequency 40, but rather provide, for instance, an increasing or decreasing course according to a pregiven profile. In doing so, it may also happen that the length of the electric arc 15, or the distance 33 from the end of the welding wire 13 to the workpiece 16, changes during the electric arc phase 36. In accordance with FIG. 4, the wire feed speed V, as opposed to the previously described Figures, is increased during the electric arc phase 36 after an increasing ramp function, or by way of an increasing profile control, until reaching the short-circuit at time 38, thus causing the end of the welding wire 13 to continuously move towards the workpiece 16. Simultaneously with the increasing wire feed speed V, the welding current I or operating current 41, after a sinking ramp function, or by way of a decreasing profile control, drops to a low value or zero during the electric arc phase 36 until the short-circuit occurs at time 38. The initiation of the short-circuit corresponding to the time duration 47 already takes place at the onset of the electric arc phase, since the time duration 46, during which the distance 33 is kept constant, is omitted due to the continuous approach of the welding wire 13 to the workpiece 16. Hence results that the time duration 44 of the electric arc phase 36 in the period duration 43 is identical with the time duration 47.

Figure 5:
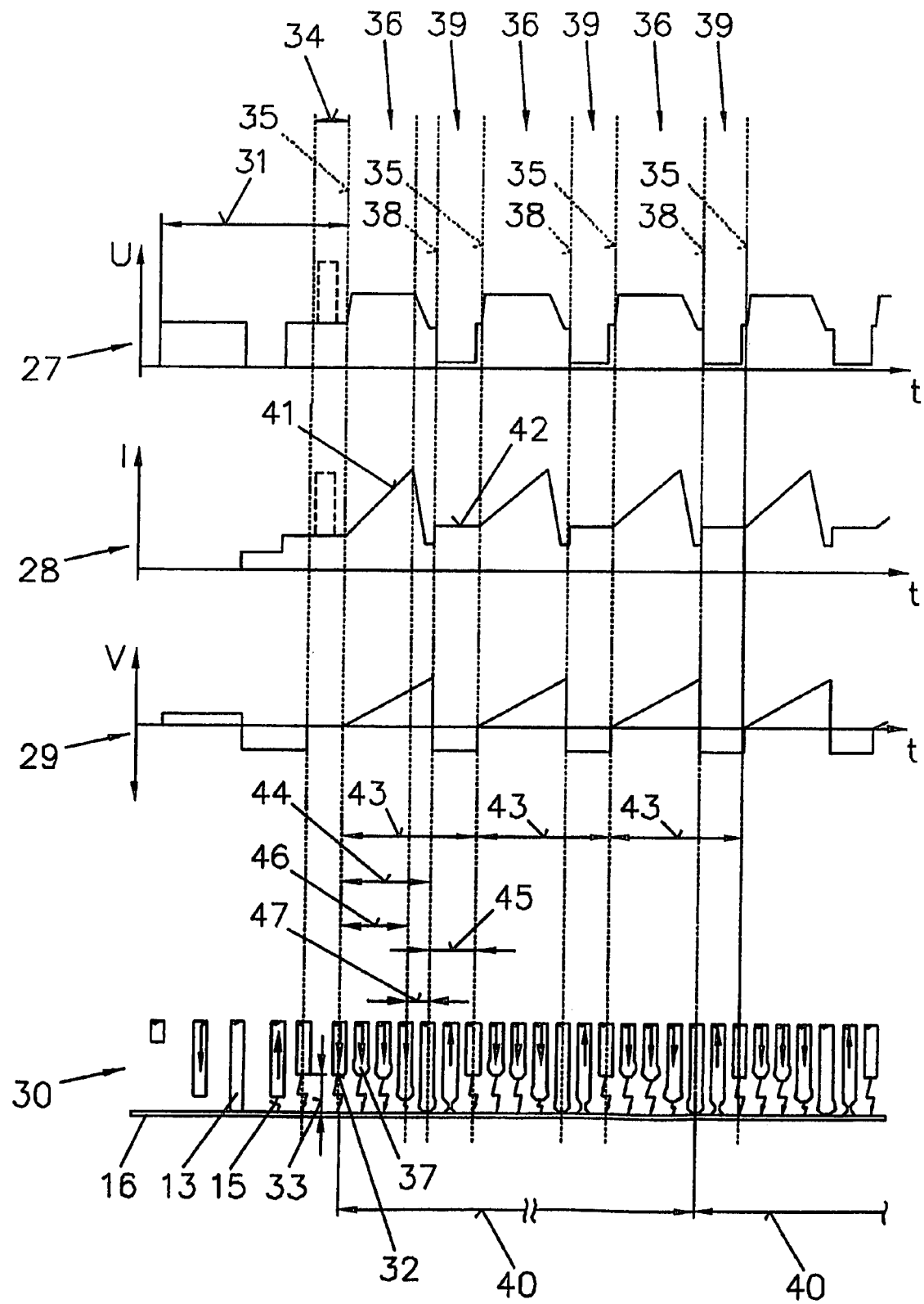

Similarly, as in accordance with FIG. 5, the operating current 41, during the electric arc phase 36, can proceed according to an increasing ramp function, or by way of an increasing profile control, during the time duration 46 and be lowered to a low value or zero for initiating the short-circuit during the time duration 47. To this end, the wire feed speed V is likewise increased according to an increasing ramp function, or by way of an increasing profile control, until reaching the short-circuit at time 38. As a result, the distance 33 is kept approximately constant during the time duration 46 until the initiation of the short-circuit, since the increasing wire feed speed V is compensated by the higher melting rate of the welding wire 13 on account of the increasing operating current 41.

Figure 6:
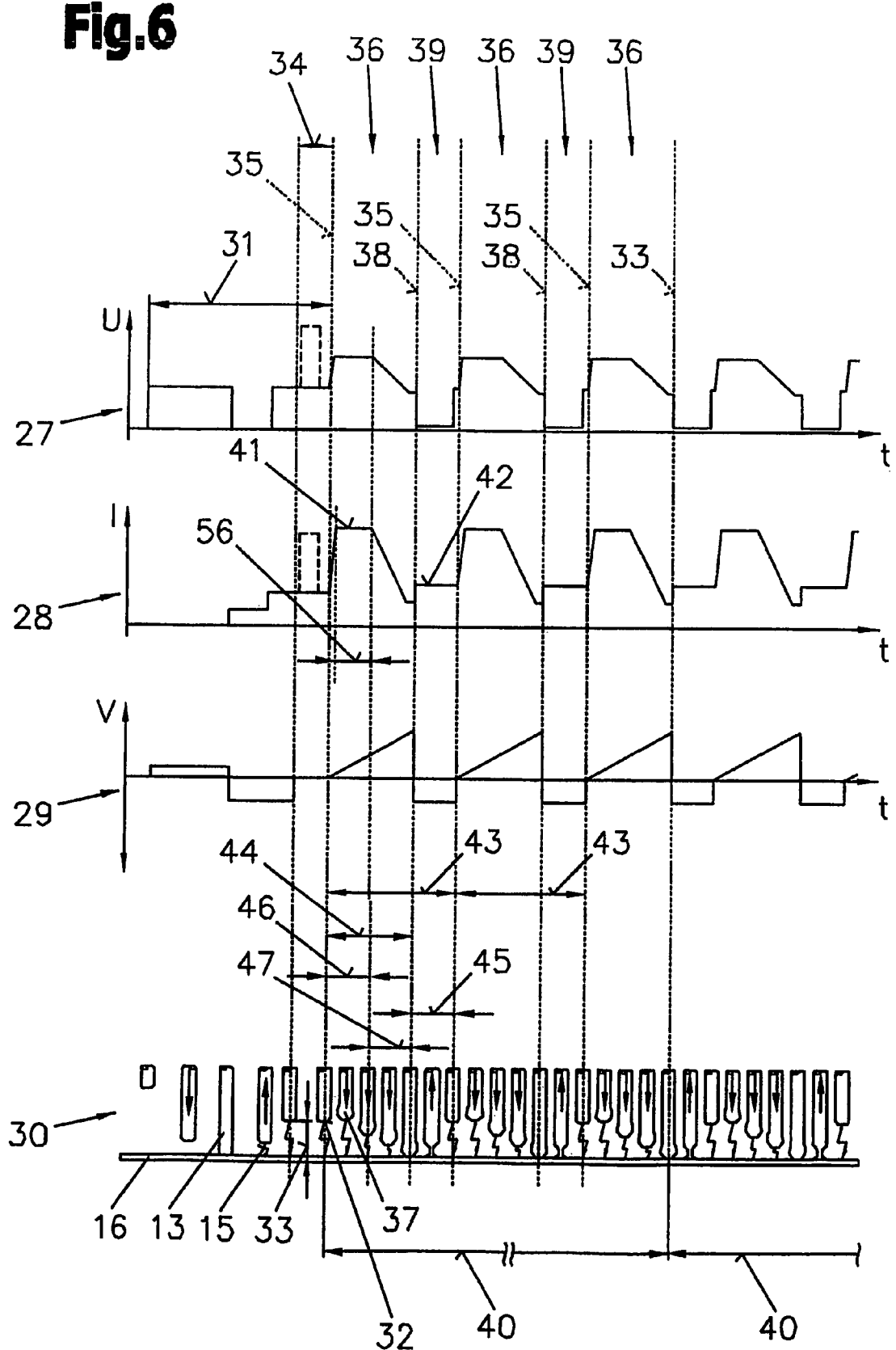

According to FIG. 6, the welding current I can be kept constant on the level of the operating current 41 for a certain time duration 56, with the wire feed speed V proceeding according to an increasing ramp function, or by way of an increasing profile control, until the time 38 of the short-circuit. This causes the welding wire 13 to continuously approach the workpiece 16, with an increased or defined melting of the welding wire 13 taking place during the time duration 56 and the distance 33 being kept approximately constant during the time duration 46. Upon expiration of the time duration 56, a premature initiation of the short-circuit occurs, whereby, in that case, the operating current 41 is lowered during the time duration 47, as already known. Consequently, only a low melting rate is provided during the time duration 47, and the droplet 37 is held in the molten state. An extension of the period 56 in which the operating current 41 is kept constant causes an extended and increased or defined melting of the welding wire 13 so as to enable a larger amount of filler material to be melted off.

Figure 7:
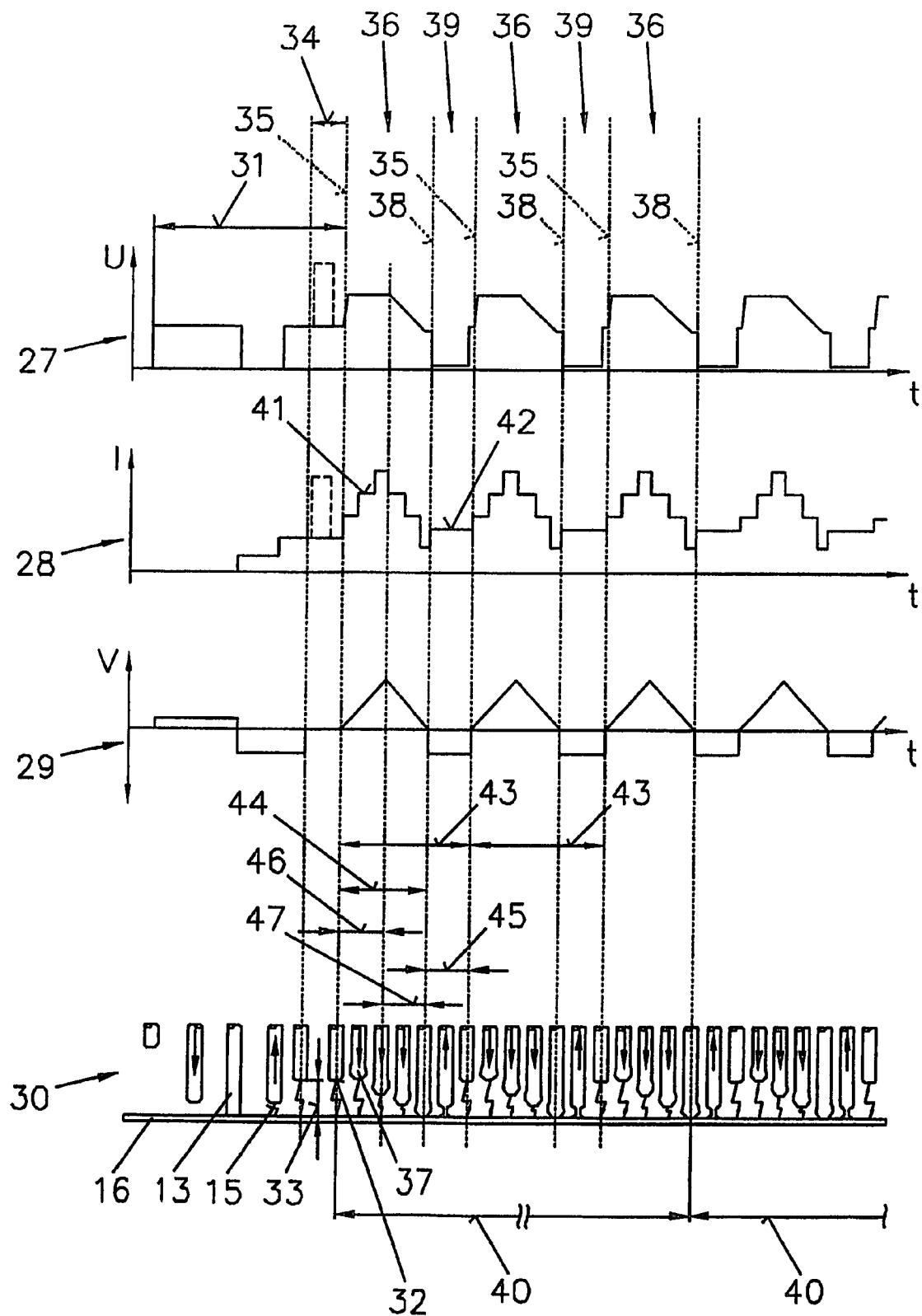

FIG. 7 illustrates a triangular course of the welding current I, or operating current 41, and the wire feed speed V during the electric arc phase 36, with the operating current 41 increasing or dropping in steps. The operating current 41 and the wire feed speed V increase during the time duration 46, while the distance 33 or length of the electric arc 15 is being kept constant. After this, a gradual initiation of the short-circuit takes place during the time duration 47, with the short-circuit occurring at the defined time 38.

A particularly advantageous application for the control as a function of the length of the electric arc is in the field of manual welding, since trembling movements of the welder will automatically be corrected by the control device 4. The CMT process can, thus, be performed at the set movement frequency 40 even in manual welding.

Figure 8:
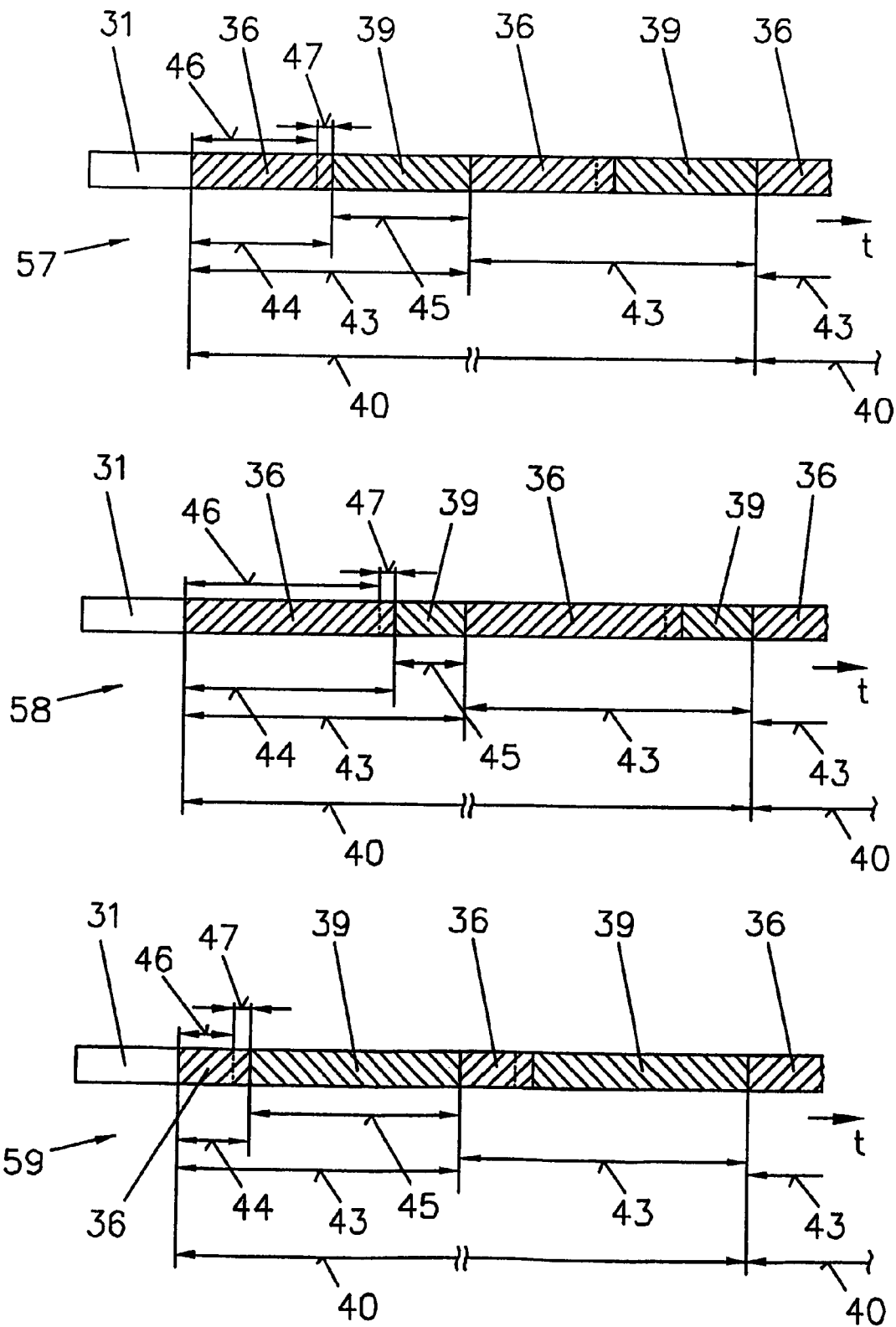
FIG. 8 depicts different settings for the heat introduction into a workpiece within a predetermined period duration during a welding process according to the invention.
Figure 9:
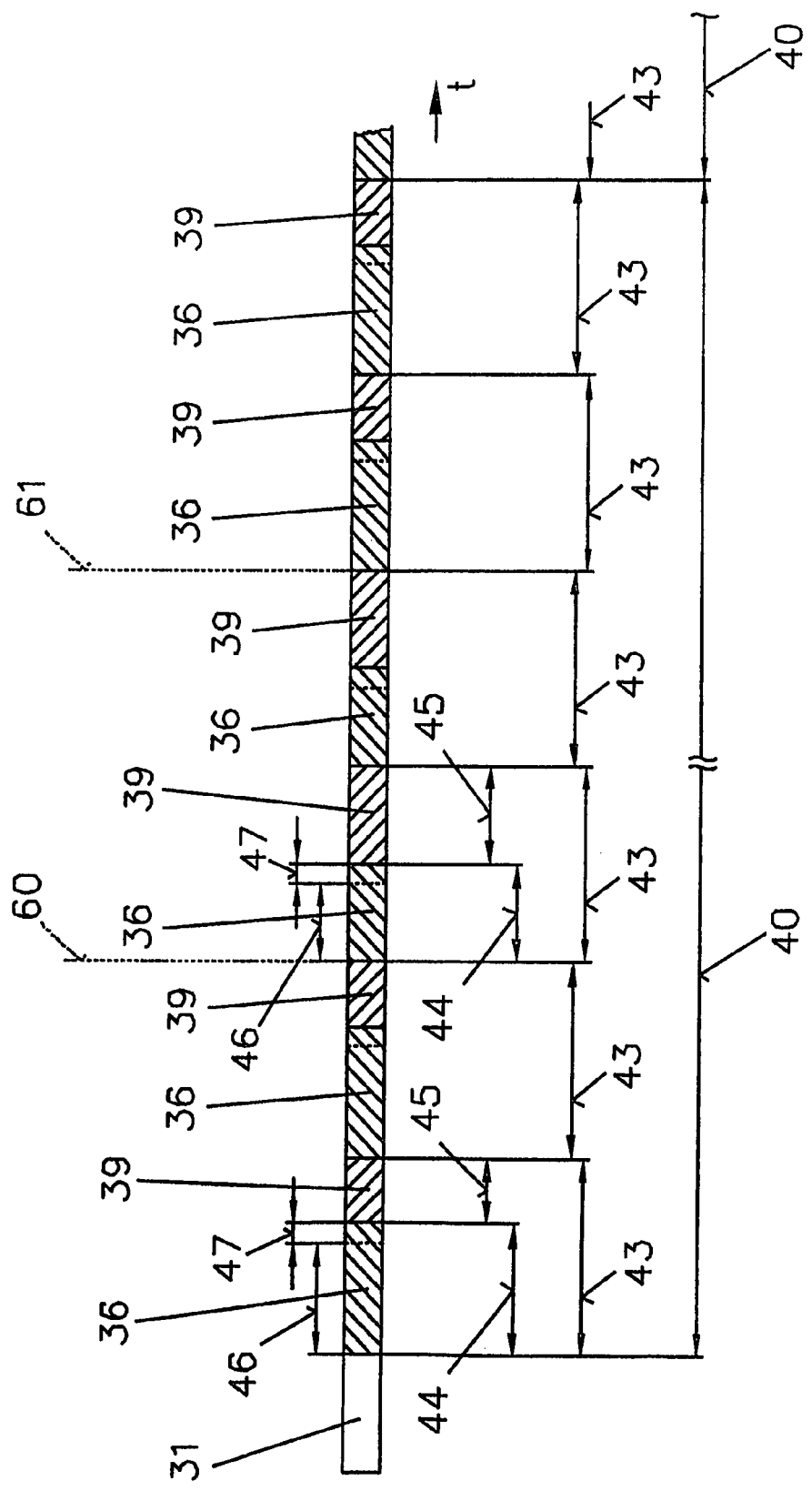
FIG. 9 illustrates the control of the heat input as a function of the material of the workpiece within a predetermined period duration during a welding process according to the invention.

FIGS. 8 and 9 depict the time courses of different method variants for changing the heat input into the workpiece 16. By controlling the electric arc phase 36 to short-circuit phase 39 ratio while observing the set moving frequency 40, or period duration 43, it is feasible to control the temperature of the melt bath and the amount of filler material. This is, for instance, effected by a heat input that is settable at the welding apparatus 1. The heat input, in particular, fixes the duration of the electric arc phase 36, since this is where the filler material amount and the heat input into the workpiece 16 are determined on grounds of the length or time of the upcoming electric arc 15. In accordance with FIG. 13, it is, for instance, possible to establish a scale from 1 to 100 for the heat input, a heat input of 50 meaning that the duration of the electric arc phase 36 and the duration of the short-circuit phase 39 are identical. If the value for the heat input is chosen to be larger than 50, the duration of the electric arc phase 36 will be increased relative to the duration of the short-circuit phase 39. By contrast, if said value is chosen to be smaller than 50, the duration of the electric arc phase 36 will be reduced and the duration of the short-circuit phase 39 will be increased.

FIG. 8 depicts simplified, schematic illustrations of the electric arc phase 36 to short-circuit phase 39 ratio in the period duration 43 in the form of diagrams, wherein different values for the heat input into the workpiece 16 are chosen for the individual diagrams. In diagram 57, a value of 50 is chosen for the heat input, in diagram 58 this value is 75, and in diagram 59, a value of 25 is chosen, the respective durations for the electric arc phases 36 and the short-circuit phases 39 resulting accordingly.

FIG. 9 is a simplified, schematic illustration of a method variant in which the heat input manually set at the welding apparatus 1 is automatically adapted to the material of the workpiece 16 by the control device 4. Hence result different electric arc phase 36 to short-circuit phase 39 ratios in the individual period durations 43 of the movement frequency 40. Different time durations 44 and 45 for the electric arc phase 36 and the short-circuit phase 39, respectively, will, in particular, result in the period duration 43, said period duration 43 remaining unchanged. As a result, the heat input into the workpiece 16 is automatically changed due to the variable time duration 44 of the electric arc phase 36. This is, for instance, effected in that the temperature of the workpiece 16 is monitored so as to enable the compensation of incorrectly set heat input values. After the ignition phase 31 with the period duration 43, the welding process is, for instance, started with a set value of 75 for the heat input and the thus resulting electric arc phase 36 to short-circuit phase 39 ratio. In doing so, the temperature of the workpiece 16 can, for instance, be detected by the aid of temperature sensors or thermal imaging cameras, whereupon the control device 4 will accordingly increase or reduce, during the welding process, the value for the heat input and the duration of the electric arc phase 36 and the time duration 44, respectively. A new electric arc phase 36 to short-circuit phase 39 ratio will, thus, adjust. As is apparent at time 60, the heat input into the workpiece 16 can be reduced by a shortened electric arc phase 36 over one or several period durations 43. If the temperature of the workpiece 16 drops to below a threshold value deposited in the control device 4, which is a function of the material of the workpiece 16, the value for the heat input will automatically be adapted accordingly by the control device 4. This is, for instance, effected in that the value for the heat input manually set at the welding apparatus 1 is adjusted by the control device 4 and, hence, again increased as illustrated at time 61. Furthermore, the control device 4 will adapt the welding parameters, in particular the welding current I and the wire feed speed V, as a function of the set electric arc phase 36 to short-circuit phase 39 ratio.

It is, of course, also possible for the control device to define a certain ratio of the duration of the electric arc phase 36 to the duration of the short-circuit phase 39, e.g. ⅔ electric arc phase and ⅓ short-circuit phase, and assign the same to the position or scale 50, whereby a percentage change of said ratio will, for instance, be effected when adjusting the value.

Irrespective of the control in respect to the heat input and movement frequency 40, or period duration 43, an appropriate control for the adaptation of the electric arc phase 36 and the short-circuit phase 39 is also feasible under special conditions during the welding process, such as, for instance, at the unexpected occurrence of a short-circuit, in order to reach the adjusted movement frequency 40 and reset the CMT process to the predefined period durations 43.

The heat input into the workpiece 16 can also be controlled via the welding current I or operating current 41. If, for instance, an increased heat input into the workpiece 16 is required, it is feasible to accordingly increase the operating current 41 during the time duration 46 of the electric arc phase 36 with the time duration 44 for the electric arc phase 36 remaining unchanged. Correspondingly, a decrease of the operating current 41 during the time duration 44 in the electric arc phase 36 will lead to a reduction of the heat input into the workpiece 16.

FIGS. 10 and 11 depict exemplary embodiments for the control of the electric arc phase 36 and the short-circuit phase 39 of a CMT process under special conditions.

FIG. 10 illustrates an exemplary embodiment in which an undefined short-circuit as caused, for instance, by melt bath movements and/or trembling movements during manual welding occurs during the electric arc phase 36 (time 62). Due to the occurrence of the undefined short-circuit at time 62, the electric arc phase 36 is interrupted and the time duration 44 is accordingly shortened, for which reason the defined short-circuit will not occur at time 38. The undefined short-circuit at time 62 is recognized by the control device 4, which causes the operating current 41 to be abruptly lowered to the base current 42 and the wire feed speed V to be inverted, and the welding wire 13 to be pulled off the workpiece 16. Furthermore, the next short-circuit phase 39 will be initiated at time 62 by the control device 4 with the predefined time duration 45 and the deposited welding parameters such as, for instance, the base current 42 and the constant wire feed speed V. The period duration 43 defined by the set movement frequency 40 will, thus, be fallen short of.

In order to again reach for the short-circuits the times 38 originally defined by the set movement frequency 40, the control device 4 will subsequently calculate an extended electric arc phase 36 with the respective time duration 44 and adapt the welding parameters, in particular the welding current I and the wire feed speed V, accordingly. After the short-circuit phase 39, the extended electric arc phase 36 will, thus, occur at time 63 with a longer time duration 44. In doing so, the operating current 41 and the wire feed speed are kept constant at a lower value so as to reach the same filler material amount and heat input as was the case in the constant electric arc phase 36 preset by the control device 4 prior the undefined short-circuit at time 62. In the extended electric arc phase 36, the next short-circuit will, furthermore, be selectively initiated in the subsequent time duration 47 following the extended time duration 46 in which the distance 33 is kept constant. This is effected in a manner already known, by lowering the operating current 41 and increasing the wire feed speed in such a manner that the next short-circuit and the short-circuits following thereupon will again occur at the times 38 defined at the beginning of the welding process.

FIG. 11 depicts an exemplary embodiment in which the period duration 43 and the time duration 45 are extended as may, for instance, be caused by trembling movements during manual welding. During a welding process, the droplet detachment may inadvertently be delayed by trembling movements in the short-circuit phase 39 following upon an electric arc phase 36, as is illustrated in the time duration 45 beginning at time 64. Hence results a longer period duration 43. The subsequent electric arc phase 36 and short-circuit phase 39 take place with the time durations 44 and 45 predefined by the control device 4, the period duration 43 being temporally deferred by the extended short-circuit phase 39. The short-circuit initiated in the electric arc phase 36 will consequently not occur at the time 38 defined by the movement frequency 40 set at the beginning of the welding process, but at a delayed time 65. In order for the next short-circuit to again occur at the time 38 defined at the beginning of the welding process, a shortened electric arc phase 36, or time duration 44, calculated by the control device 4 will then follow, starting at time 66. The welding parameters, in particular the welding current or operating current 41 and the wire feed speed, in the time duration 46 will be increased such that the filler material amount and the heat input will remain unchanged in the shortened time duration 46 as compared to an electric arc phase 36 with the predefined time duration 44 and 46, respectively. After the shortened time duration 46, the already known initiation of the defined short-circuit will be effected in the time duration 47 during the electric arc phase 36 so as to make the short-circuit occur at the defined time 38. The defined short-circuits will, thus, again follow at times 38 with the period durations 43 defined by the movement frequency 40.

In general, it should be noted in respect to FIGS. 10 and 11 that the automatic control of the electric arc phase 36 and the short-circuit phase 39 may comprise several period durations 43 to reach, in the period durations 43, the short-circuit times defined by the movement frequency 40, from which a short-circuit grid will results. The period duration 43 resulting from the set movement frequency 40 is, thus, a mean period duration 43. Similarly, an exceedance of the short-circuit grid as described in FIGS. 10 and 11 can be corrected by restarting, i.e. resetting, the short-circuit grid and the welding process profile calculated by the control device 4. This may, for instance, be done after the expiration of a period duration 43, i.e. at the beginning of an electric arc phase 36, or directly after the occurrence of an undefined short-circuit.

As described in the variant embodiments, the automatic control of the observance of the movement frequency 40 is preferably performed in the electric arc phases 36, since there the heat input, or melt bath temperature, and the amount of filler material can be controlled in an advantageous manner. It is, of course, also possible to compensate for an altered time duration 44 or 45 by the subsequent time duration 44 or 45 or process phase, respectively, to which end a higher processor output and higher control engineering expenses will be required.

By the selective reduction of the welding current or operating current 41 in the electric arc phase 36 for initiating the short-circuit or short-circuit phase 39, weld spatter will be avoided.

An essential advantage of the movement frequency control resides in the option to influence vibrations of the melt bath and, in particular, compensate or increase such vibrations. For instance, at a low movement frequency 40, the natural vibration of the melt bath is kept low so as to provide a quiet melt bath with little weld spatter. By contrast, an increase in the movement frequency 40 will cause the natural vibration of the melt bath to increase, thus ensuring enhanced gap bridging.

In general, a plurality of welding parameters are required for a welding process, which are either directly set at the welding apparatus 1 or indirectly calculated and controlled by the control device 4. As described in the variant embodiments, at least two parameters, i.e. the movement frequency 40 and at least one additional welding parameter such as, e.g., the material, are to be set directly at the welding apparatus 1 by the operator. All other welding parameters are detected and/or calculated and set by the control device 4.

An input and/or output device 22 for inputting the welding parameters is illustrated in FIG. 12, wherein the set welding parameters are passed on to the control device 4 of the welding apparatus 1 to enable the same to control a respective welding process. In the exemplary embodiment illustrated, two rotary knobs 68, 69 are arranged on the input and/or output device 22, wherein the movement frequency 40 can be set by the rotary knob 68 and the material and its thickness can be set by the rotary knob 69. Knob 68 serves to set the movement frequency 40 of the welding wire 13 on a scale ranging from 0 Hz to 150 Hz, the movement frequency 40 defining the number of short-circuits per second. In addition, a display 70 is arranged on the input and/or output device 22, which display informs on the welding parameters calculated by the control device 4, such as the welding current, the wire feed speed, etc. One of the keys 71, which are arranged on the input and/or output device 22, serves to switch to the welding parameter to be indicated on the display 70. To this end, light diodes 72 and abbreviations for the welding parameters, for instance A for the welding current, are arranged below the display 70 on the input and/or output device 22. The light diodes 72, thus, indicate the welding parameter whose value is represented in the display 70. Based on the combined settings effected on the rotary knobs 68 and 69, the control device 4 is able to calculate time durations for the electric arc phase 36 and the short-circuit phase 39, the other welding parameters for reaching the time durations being likewise calculated automatically.

It is, furthermore, also possible for the user to set several welding parameters from which the welding process profile will be calculated by the control device 4. To this end, an additional rotary knob 73 is, for instance, arranged as illustrated in FIG. 13, which serves to set the heat input into the workpiece 16 on the input and/or output device 22. The rotary knob 73 may, for instance, comprise a scale for the value of the heat input from 1 to 100, said value, for instance, determining the time duration for the electric arc phase 36 and the height of the welding current. In connection with the movement frequency 40, an electric arc phase 36 and short-circuit phase 39 ratio will thus result.

It goes without saying the user may preset any desired number of welding parameters and, in particular, the welding current I, the welding voltage U, the welding wire diameter, the wire feed speed V, etc., from which the control device 4 will calculate the welding process profile. These settings may, for instance, be stored by one of the keys 71. It is also possible for the user to change the welding parameter values indicated on the display 70 anytime, whereupon the control device 4 will accordingly effect a correction of the other welding parameters in order to again reach the set movement frequency 40. It is, moreover, possible to use a touch screen or any other input or output device 22 known from the prior art, instead of the input and/or output device illustrated.

For the fixation of the individual reference values for the welding parameters, various characteristics can be deposited in a database within the welding apparatus 1, or the individual values can be calculated by appropriate calculation methods.

The welding parameters, in particular the movement frequency 40 and the heat input into the workpiece 16, may also be set or altered via a remote controller integrated in the welding torch 10. This is advantageously used in manual welding processes, since it will enable the rapid adaptation of the welding parameters, particularly during a welding process, unless these are automatically controlled by the control device 4.

The invention claimed is:

1. A cold-metal-transfer welding process performed by a welding installation, the cold-metal transfer process being defined by cyclic alternation of an electric arc phase and a short-circuit phase;
    wherein, during the electric arc phase, a welding wire is moved in a direction of a workpiece until contacting the workpiece;
    wherein subsequently, after formation of a short-circuit and during the short-circuit phase, a wire transport is reversed and the welding wire is moved away from the workpiece;
    wherein at least one of a welding current and a welding voltage are controlled during the electric arc phase in such a manner that the welding wire is melted to form a droplet;
    wherein formation of an electric arc during the short-circuit phase is prevented via the welding current;
    wherein a movement frequency of the welding wire and at least one additional welding parameter are directly elected and input into a control element of the welding installation by a user, a number of electric arc phases and short-circuit phases per second being defined by the movement frequency;
    wherein the movement frequency and the at least one additional welding parameter are transmitted to a control device of the welding installation;
    wherein all other welding parameters required to implement the movement frequency are automatically determined and set and controlled by the control device based on the movement frequency and the at least one additional welding parameter;
    wherein a length of the electric arc between the welding wire and the workpiece is monitored during the electric arc phase;
    wherein changes in the length of the electric arc are controlled via a wire feed speed and the welding current in such a manner as to cause the short-circuit phase to occur at the movement frequency; and
    wherein the at least one additional welding parameter is selected from the group consisting of a material of the workpiece, a material thickness of the workpiece, a diameter of the welding wire, a melting rate of the welding wire, and a heat input into the workpiece.

2. The cold-metal-transfer welding process according to claim 1, wherein welding parameters during the electric arc phase over a defined time duration for the formation of the droplet on the welding wire are controlled in such a manner that as the wire feed speed is constant a constant distance of the welding wire to the workpiece is achieved during the defined time duration;
    wherein the defined time duration is at least a major portion of a time duration of each electric arc phase, and
    wherein the constant distance corresponds to the length of the electric arc.

3. The cold-metal-transfer welding process according to claim 1, wherein, during the electric arc phase, in order to initiate the short-circuit phase, the welding current is lowered to keep the droplet of the welding wire in a molten state without further melting of the welding wire.

4. The cold-metal-transfer welding process according to claim 3, wherein, during the electric arc phase and during or after the lowering of the welding current, the wire feed speed is increased to reduce the length of the electric arc between the welding wire and the workplace until the short-circuit occurs, the short-circuit initiating the short-circuit phase.

5. The cold-metal-transfer welding process according to claim 1, wherein, during the short-circuit phase, welding parameters are controlled by the control device to change a duration of the short-circuit phase so as to cause a subsequent electric arc phase to start in accordance with the movement frequency.

6. The cold-metal-transfer welding process according to claim 1, wherein the at least one additional welding parameter is a heat input into the workpiece; and
    wherein at least one of:
        a ratio of a duration of the short-circuit phase to a duration of the electric arc phase, and
        a profile of the welding current are fixed by the control device as a function of the heat input.

7. The cold-metal-transfer welding process according to claim 1, wherein the movement frequency is between 1 Hz and 150 Hz.

8. The cold-metal-transfer welding process according to claim 1, wherein the movement frequency and the at least one additional welding parameter are controlled as a function of at least one of a defined profile of the length of the electric arc and a welding voltage.

9. A welding installation including:
    a welding apparatus;
    at least one control device including a memory for at least one of operation data and programs;
    a current source;
    a wire feeder for transporting a welding wire;
    a welding torch connectible to the welding apparatus; and an input device including first and second control elements for setting welding parameters;

wherein through the first control element a movement frequency to define a number of electric arc phases and short-circuit phases per second can be directly set;

wherein the at least one control device is programmed to, based on the movement frequency input through the first control element and based on a second welding parameter input through the second control element, automatically determine, set, and control all other parameters required to implement the movement frequency; and wherein the second control element is a control element for setting the material and the material thickness of a workpiece or is a control element for setting a value for heat input into a workpiece.

10. The welding installation according to claim 9, wherein the first control element is designed as a rotary knob.

11. The welding installation according to claim 9, wherein the second control element is designed as a rotary knob.

12. The welding installation according to claim 9, wherein the input device further comprises an output device comprising a display with an input field; and wherein at least one of the first control element and the second control element is comprised of the display.

13. The welding installation according to claim 9, wherein at least one of the first control element and the second control element is comprised of a touch screen.

14. The welding installation according to claim 9, wherein the first and second control elements are disposed on a remote controller arranged on the welding torch.

* * * * *